Patented Jan. 4, 1944

2,338,187

UNITED STATES PATENT OFFICE 2,338,187

HEAT STABLE COMPOSITION CONTAINING VINYL CHLORIDE POLYMERS

John Richard Lewis, Leslie Budworth Morgan, and William McGillivray Morgan, Blackley, Manchester, England, assignors to Imperial Chemical Industries Limited, a corporation of Great Britain No Drawing. Application June 30, 1941, Serial No. 400,476. In Great Britain July 11, 1940

4 Claims. (Cl. 260—88)

The present invention relates to the production of compositions containing high polymers made from vinyl chloride and has for its object the production of compositions of the kind described which are stable to heat. By the term "high polymers" we designate polymers of high average molecular weight in contradistinction to "small polymers" such as dimers and trimers.

As is known, when vinyl chloride is so treated that it becomes polymerised, different polymers are obtained according to the conditions of polymerisation; and many interpolymerides of vinyl chloride with other polymerisable compounds have been described. These various polymers and interpolymers can all be regarded as consisting of chain-like molecules, some or all of whose structural units consist of the group

and all are to be regarded as high polymers made from vinyl chloride. Such high polymers are known to be comparatively unstable to heat, that is to say they suffer partial decomposition and develop undesirable coloration when exposed to elevated temperatures. It is an object of the present invention to provide high polymers made from vinyl chloride which shall be substantially free from this heat instability.

According to our invention heat-stable compositions contain a high polymer made from vinyl chloride with which is admixed a metal salt of 2:4 dihydroxyquinoline, said metal being of the class comprising the alkali metals, lead and zinc.

The compositions of the invention are not limited to those of the two ingredients, namely, the high polymer and the metallic derivative, but include also those wherein plasticisers, solvents, fillers, pigments, or other ingredients also are present.

The proportion of metallic derivative is small in relation to that of the high polymer. Preferably we use about 5% of stabiliser calculated on the combined weights of polymer and plasticiser. Larger proportions of stabiliser are unnecessary.

In carrying the invention into practical effect the metallic derivative is added to the high polymer in any convenient way and is brought into uniform admixture by stirring, kneading or milling, the manner of working being suited to the consistency of the high polymer itself, or to the order of adding plasticisers or other ingredients.

There are thus obtained compositions very stable to heat.

The compositions may, of course, be produced in such a form that they may be moulded or shaped by other means, so that solid shaped articles made from the compositions come within the scope of the invention.

In order that our invention may be fully understood, it is illustrated, but not limited by the following example, in which the parts are by weight.

Example 50 parts of a flocculose substance consisting mainly of polyvinyl chloride, made as described in example of British Specification No. 15790/39, 2.5 parts of the sodium salt of 2:4 dihydroxyquinoline and 25 parts of tricresyl phosphate are worked together on a roller mill (as used for rubber) with the rollers heated at about 110–120° C. until a sheet of homogeneous material is obtained.

When a sample of this material was heated in an oven for 14 days at 100° C. it remained rubber-like and darkened only very slightly. A sample of a similar material made without any added salt of 2:4 dihydroxyquinoline became completely black after only three days in the oven at 100° C.

In the above example the mixing was carried out in a roller mill. Other mixers may be used, for example, an internal mixer. Instead of the sodium salt of 2:4 dihydroxyquinoline there may be used the lead or zinc salts.

We claim:

1. A heat-stable composition containing a high average molecular weight polymerized vinyl chloride with which is admixed a metal salt of 2:4 dihydroxyquinoline, said metal being selected from the group consisting of the alkali metals, lead and zinc.

2. A heat-stable composition according to claim 1, in which the proportion of metal salt admixed does not exceed 5% by weight calculated on the combined weights of the high polymer and of the metal salt.

3. A heat-stable composition according to claim 1, in which the metal salt used is the sodium salt.

4. A process for the production of heat-stable compositions containing a high average molecular weight polymerized vinyl chloride which comprises incorporating with said high polymer a metal salt of 2:4 dihydroxyquinoline, said metal being selected from the group consisting of the alkali metals, lead and zinc.

JOHN RICHARD LEWIS.
LESLIE BUDWORTH MORGAN.
WILLIAM McGILLIVRAY MORGAN.